United States Patent
Battistoni et al.

[15] 3,635,797
[45] Jan. 18, 1972

[54] ENZYMATIC COMPOSITION

[72] Inventors: John J. Battistoni; William E. Hibbard, both of Las Vegas, Nev.

[73] Assignee: Nevada Enzymes, Inc.

[22] Filed: Nov. 18, 1968

[21] Appl. No.: 776,772

[52] U.S. Cl. .................................. 195/56, 210/11, 252/89, 252/152, 252/DIG. 12
[51] Int. Cl. ........................................................ C02c 1/02
[58] Field of Search ................... 195/56, 18, 63, 63 P, 68, 34; 210/2, 11; 252/DIG. 12, 89, 152

[56] References Cited

UNITED STATES PATENTS

| | | | |
|---|---|---|---|
| 1,820,957 | 9/1931 | Wallerstein | 195/64 |
| 2,424,049 | 7/1947 | Parker et al. | 134/3 |
| 3,404,068 | 10/1969 | Batistoni | 195/61 |
| 3,519,570 | 7/1970 | McCarty | 195/63 |

FOREIGN PATENTS OR APPLICATIONS

| | | | |
|---|---|---|---|
| 20,291 | 11/1960 | Germany | 252/DIG. 12 |

Primary Examiner—A. Louis Monacell
Assistant Examiner—Robert M. Elliott
Attorney—Jerry R. Seiler

[57] ABSTRACT

Multienzymatic composition comprises an enzymatic fermentation reaction product, surfactants, citric and lactic acids, urea and pine oil.

7 Claims, No Drawings

ENZYMATIC COMPOSITION

The use of enzymes to improve the biological degradation of organic matter is well known. It has been found especially advantageous to add quantities of a number of enzymes directly into septic systems and sewage treatment ponds in order to catalyze the digestion of organic impurities and to stimulate natural bacterial action. The enzymes are usually added in dry inactive form directly to the waste-containing mixtures and become activated when dissolved. However, it is further appreciated that enzymes are highly specific as to the substrate materials upon which they will act and are further delicate in that pH factors, temperatures, etc., must be within limited ranges for suitable enzymatic activity. With these realizations, it is necessary to select various types of enzymes which will promote the degradation of various impurities. Further, many of the enzymes, which although are useful for catalyzation of the organic impurity degradation, do not add or offer materials to the treating system which will improve or intensify bacterial growth and activity.

The cleaning of accumulated organic waste materials from drain and sewage lines has generally been limited heretofore to the use of various mechanical devices or harsh chemicals which degrade the waste materials. However, such mechanical devices are not standard household items and their use is often inconvenient and time consuming as well as costly, should commercial contractor assistance be required. Although chemical drain and sewage line cleaning compositions are effective, they contain harsh caustics or acids which must be handled with great care since they are extremely toxic and poisonous. Even slight contact with animal tissue can cause severe injury. Such compositions if allowed to remain in contact with metal or concrete pipes can result in extensive corrosion. Further, the harsh and toxic constituents are not conductive to bacterial activity within septic systems and tend to degrade enzymatic activity by upsetting otherwise suitable pH levels. It will also be appreciated that undue accumulation of such chemicals within drain fields will have a sterilizing effect on the surrounding soil which is detrimental to plant life. Other chemicals commonly used in dissolving organic matter and especially in many commercial and industrial applications are the petroleum hydrocarbon solvents. Although effective, these products are highly volatile, toxic, flammable and irritating to the skin especially on any extended contact. The solvents are also quite immiscible with water and accordingly only difficulty removed from premises by conventional washing techniques.

The composition of the invention comprises a mixture of naturally fermented organic materials combined with surfactants and other biologically stimulating ingredients. The composition not only greatly improves sewage treatment facility capabilities by stimulating bacterial growth, eliminating odors, enzymatically improving the catalytic degradation of sewage impurities, but in itself is a strong and effective cleaning composition, and improves aeration and bacterial activities of soils to which it is added. The composition is highly effective in cleaning and removing accumulated wastes from sewage and drainage pipes in which organic matter has built up but is non-corrosive, nontoxic and completely biodegradable. The product is also extremely useful in digesting and removing organic materials such as grease, oil, etc., from substances and yet is not irritating, toxic or flammable as are the known hydrocarbon and chlorinated hydrocarbon solvents. The constituents render it not only safe to use but beneficial to plant and soil assimilation. These as well as other advantages will become more evident from the following detailed description of the invention.

The basic enzymatic portion of the composition of the invention comprises a fermented mixture of molasses, raw cane sugar, malt, yeast and a magnesium salt catalyst. The fermentation reaction components comprise a mixture having the following proportions by weight:

| | |
|---|---|
| Molasses | 40–80% by weight |
| Cane Sugar | 10–40% by weight |
| Malt | 3–15% by weight |
| Yeast | 0.2–5% by weight |
| Magnesium Salt | 0.2–5% by weight |

The molasses used in preparing the fermented mixture is black untreated cane molasses commonly referred to as cane blackstrap molasses, or simply blackstrap. This material is syrupy mother liquor recovered in refining cane sugar from which crystallizable sucrose has been removed. The blackstrap molasses generally contains up to about 50 percent sucrose in addition to reducing sugars such as glucose and maltase as well as ash, organic nonsugars and some water. The presence of the sugars of the type found in the molasses is important in encouraging the activity of the enzymes and the yeast bacteria by which they are produced. Although the untreated cane blackstrap molasses is preferred, other molasses such as beet molasses, barrel molasses and the like may also be used as a natural source of the materials required for the enzymatic fermentation. Preferred concentrations of the molasses are between about 55 and about 75 percent by weight.

It has been found that optimum biological and enzymatic properties afforded by the fermentation reaction product are improved where a portion of the fermentable materials present in the mixture comprises raw sugar. Raw sugar is defined as the sugar product which has not been refined and which contains residual molasses as well as other natural impurities. Although it is not clearly understood, it has been found that the presence of raw sugar in the fermentation reaction yields significantly improved properties as compared to the use of refined sugars which contain residual chemicals used in the decolorization and final purification and refinement which may have some deleterious effect on the yeast and malt enzymes. The amount of sugar present in the fermenting composition may be up to about 40 percent by weight and is preferably between about 10 and about 30 percent.

The essential enzymes present in the composition of the invention are provided by yeast and malt. The specific yeast utilized is *Saccharomyces Cerevisiae* commonly available as baker's yeast. A number of enzymes are produced by the active yeast especially during the fermentation reaction and include both hydrolytic and oxidative enzymes such as invertase, catalase, lactase, maltase, carboxylase and others. It will be appreciated that actual amounts of the various types of enzymes produced will be dependent on a number of factors including the types of molasses and sugar used in preparing the fermentation mixture. However, again it is believed that, in utilizing the blackstrap cane molasses and raw sugar, optimum enzyme yields and activity are obtained.

Additional enzymes which advantageously contribute to the fermentation reaction and the final composition obtained therefrom are realized by the addition of malt. The specific malt utilized is preferably a diastatic malt which contains enzymes including diastase, maltase and amylase. The malt also is believed to improve the activity of the yeast in addition to contributing to the overall potency and activity of the enzymatic composition within the final product mixture. The amount of yeast used in the fermentation composition is between about 0.5 and about 5 percent and preferably between about 1 and about 3 percent. The amount of malt present may be between about 2 and about 10 percent and preferably between about 5 and about 10 percent by weight. It will again be appreciated that specific amounts of the materials utilized may be varied to yield optimum compositions desired.

The presence of a small amount of inorganic catalyst such as magnesium salt enhances the activity of the enzymes not only during the fermentation reaction but thereafter in the product composition in attacking and decomposing the organic waste materials. Magnesium sulfate is especially useful for this purpose and small amounts, for example, between about 0.1 and 5 percent and preferably between about 0.5 and 3 based on the fermentation reaction mixture are suitable for this purpose.

The fermentation reaction may be conveniently carried out according to the following procedure: The molasses, sugar and magnesium salt are added to a suitable amount of warm and preferably softened water. Although the specific amount of water used to which the materials are added is not particularly critical, it is necessary in order to facilitate easy admixture as well as to activate the yeast and dissolve the other materials. Suitable amounts of water are from about 2 to about 20 times the total weight of the active ingredients used in the fermention reaction. The water must meet certain temperature requirements in order to prevent inactivation of the enzymes. Thus, for example, water temperatures greater than about 150° F. must be avoided and preferred temperatures are between about 80° and about 110° F. The use of cold water may result in unduly slow fermentation reaction rates and, thus, should also be avoided where increased reaction rates are desired. The use of soft water, although not critical, seems to produce more effective and rapid fermentation reactions as compared to hard water which contains significant amounts of calcium. After the molasses, sugar and magnesium salt have been effectively mixed and dissolved, the malt and the yeast are added, the mixture stirred and allowed to set until fermentation is essentially complete. The reaction time may be between about 2 and about 5 days at temperatures between about 70° and 110° F. Completion may be readily ascertained by noting that the effervescence of the reacting mixture has substantially subsided. Again, it is preferred to allow the mixture to stand at temperatures between about 70° and 110° F. in order that the reaction time will not be unduly prolonged. However, somewhat lower temperatures may be utilized where rapid fermentation times are not especially desired.

Following the fermentation reaction, the mixture is compounded with surfactants, citric and lactic acids, urea and pine oil. These additional materials may be added in any desirable order with suitable agitation and mixing so as to effect homogeneity. However, it should be noted that the fermentation reaction should be allowed to be substantially completed before admixture with the surfactant materials. It has been found that the presence of these materials during fermentation tends to inhibit bacterial and enzymatic activity and production because of basicity, concentrations, etc. The amount of fermentation reaction product may be limited over a wide range depending on uses, odor requirements, etc. However, for general compositions having a wide latitude of sewage and cleaning capabilities on further dilution, amounts between about 10 and about 25 percent based on the active ingredients yield very effective compositions.

Synthetic detergents utilized in the instant composition are those which are readily biodegradable, that is, which may be acted upon by bacteria and thereupon be reduced to their elemental constituents upon disposal. Accordingly, the petroleum derived synthetic detergents such as alkyl aryl sulfonates are to be avoided. Preferred detergents are the anionic-type surfactants and particularly the sodium alkyl sulfates prepared by sulfating vegetable and animal fats and oils and alcohols and their mixtures derived from the reduction or hydrogenation of the corresponding fatty acids. Coconut, palm, tallow, castor, olive, citrus and similar oils are generally used for this purpose, the specific oil or fat material being dependent on the desired properties of the resulting detergent. The preferred fats and oils are those containing fatty acids which yield alcohol and alcohol mixtures having between about 8 and about 20 carbon atoms, the sulfates of which are neutralized with caustic in order to produce the final water soluble detergent. Mixtures of coconut oil and fatty acid derived alcohols have been found to be especially useful in view of the desirable detergent properties obtained. Other suitable sulfates are those prepared by sulfating olefins resulting in secondary alkyl sulfates having between about eight and about 20 carbon atoms. Mixtures are especially useful in providing compositions having surfactant properties similar to those of the sulfated natural oil and fat derivatives. Other anionic surfactants include the soaps and alkali metal salts of fatty acids having from 10 to 18 carbon atoms and mixtures thereof. Salts of palmitic, stearic and oleic acids are preferred, and thus mixtures derived from palm and olive oils, lard and tallow are especially useful. The total amount of the anionic type surfactant may be up to as high as, for example, 65 percent by weight based on the total active ingredients (excluding water) of the final composition. Preferred amounts are up to about 40 percent by weight.

In order to render the composition somewhat more versatile, it is preferred to substitute some portion of the anionic detergents with one or more nonionic surfactants. Useful nonionic type surfactants are condensates of ethylene oxide with alkyl phenols, for example, alkyl aryl polyethylene glycols such as alkyl phenyl ethers of polyethylene glycol. Materials of this type are commercially available, for example, as the Tergitol nonionic surfactants. Polyoxyethylene esters of sorbitan fatty acids and the like may also be used. The amount of the nonionic-type surfactants is preferably in the order of up to about 20 percent by weight based on the total active ingredients.

The above-noted surfactants are generally used for their detergent properties since they enhance the cleaning capabilities of the composition and improve its effectiveness in removing organic deposits in sewage and drain pipes. The surfactants further are also effective in emulsifying organic materials which are acted upon and decomposed by the enzymatic and bacterial actions of the composition. These surfactants have an added advantage when used in the treatment of water sources since they reduce the surface tension characteristics of the treated solutions thereby providing for increased precipitation of undesirable materials otherwise held at the surface of the water. This advantage is especially useful for mosquito abatement and the like such as in the reclamation of polluted streams, lakes, reservoirs, etc.

It has also been found useful to enhance or fortify the surfactant properties of the compositions by the addition of known inorganic surface active agents such as sodium tripolyphosphate, sodium pyrophosphate, sodium borate, sodium sesquicarbonate, sodium silicates, etc., and mixtures thereof. The presence of such materials further enhances cleaning efficiencies and offers more versatile surface activity to the composition. The total amount of surfactants based on the active ingredients on the compositions is between about 25 and about 70 percent by weight and preferably between about 40 and about 60 percent by weight. Very suitable concentrations, for example, have been found by utilizing a surfactant mixture of between about 10 and about 20 percent by weight inorganic surfactants, between about 5 and about 15 percent nonionic surfactants, and between about 15 and about 30 percent by weight anionic surfactants. Expressed as a mixture of surfactants, preferred concentrations of surfactants within the mixture are: from 30 to 70 percent anionics, from 10 to 30 percent nonionics and from 20 to 40 percent inorganics.

The use of citric and lactic acids not only has been found to improve the cleaning capabilities of the composition, but further in view of their weakly acidic characteristics helps to maintain the pH of the composition at suitable levels so as to prevent undue reduction in enzymatic and bacterial activity. Thus, it has been empirically noted that compositions from which the citric and lactic acids have been omitted do not perform with the acidity levels found in compositions containing these materials. The presence of the acids is also found to enhance the metal cleaning capabilities of the composition, amounts of citric acid between about 0.5 and about 5 percent preferably between about 1 and about 2 percent with lactic acid concentrations between about 2 and about 10 percent and preferably between about 4 and about 8 percent being useful. It is further believed that the lactic acid when acted upon by certain enzymes produced by the yeast bacteria yields products such as pyruvic acid, the salt of which is known to have desirable properties in improving biological activation.

The presence of urea, which is added in amounts up to about 40 percent and preferably between about 10 and about 30 percent by weight of the active ingredients, further improves the overall enzymatic and biological activity of the composition. The presence of urea plays an important part especially in the aeration and deodorization of sewage or waste absorption fields by its presence. Under such conditions, the urea is hydrolyzed by the enzyme urease produced by bacteria found, for example, in the soil, the products of which are extremely useful in further enhancing bacterial activity with concomitant aeration and reduction in odors of these soils. Within sewage treatment facilities, the enzymatic conversion of the urea results in an effervescent reaction by the release of ammonia which further improves the biological degradation and digestion of sewage impurities.

The presence of a small amount of up to about 5 percent and preferably between about 0.5 and about 5 percent by weight pine oil has also been found to enhance the product activity characteristics. The natural pine oils obtained by steam distilling various pine tree products are preferred over synthetic pine oils which have not been generally found to yield similar results. The presence of the pine oil not only improves the surface activity characteristics of the composition but improves odor characteristics of the product. The pine oil also appears to enhance biological and enzymatic activities.

The total amount of water present in the product composition may be varied widely depending on the desired concentrations of active ingredients and the intended uses of the composition. Accordingly, in preparing a concentrate which may or may not be further diluted, appropriate ratios of water to active ingredients may vary between about 2:1 and about 20:1 by weight respectively. Yet upon use, the concentrate may be further diluted to yield a composition having such ratios between about 20:1 up to, for example, 100:1 or greater. Extensive dilution will commonly be practiced where the product is to be applied to large areas such as leeching fields and the like. Yet, it is to be understood that such compositions are intended to be within the scope and purview of the invention.

By way of illustration, the following composition was prepared and tested under a number of conditions such as those specified herein. The example is not to be considered as limiting the scope of the invention to the specific materials and proportions set forth herein and is for the purpose of illustration only.

EXAMPLE

Approximately 1,000 gallons of warm softened water having a temperature of between about 85°–100° F. was placed in a large tank. To the water was added 700 pounds black untreated cane molasses, 210 pounds raw can sugar and 10 pounds magnesium sulfate. The mixture was thoroughly blended, after which 95 pounds diastatic malt and 10 pounds baker's yeast were added and agitated slightly. The composition was allowed to stand for about 3 days, after which the effervescent reaction had subsided, indicating essentially complete fermentation. An additional 1,000 gallons of hot softened water (140°–150° F.) were added to the aqueous fermentation reaction mixture followed by 750 pounds sodium tetradecyl sulfate (Tergitol anionic 4), 710 pounds of alkyl phenyl ether of polyethylene glycol (Tergitol nonionic NPX), 950 pounds sodium salt of sulfated coconut oil fatty acid alcohols, 950 pounds of a mixture of sodium sesquicarbonate, sodium borate and sodium tripolyphosphate and 65 pounds citric acid. Again the composition was thoroughly blended to effect solution; and while stirring was continued, 135 pounds pine oil, 350 pounds lactic acid and 1,575 pounds urea were added. Water was then added to bring the volume to about 4,500 gallons and stirring continued until complete mixing had been obtained. The composition was found to be nonirritating to skin tissue, nontoxic and could be stored in a cool location over periods of months without any discernible loss in effectiveness or deterioration. The product was found effective in cleaning grease from polished chrome, aluminum, stainless steel, copper and the like with no adverse chemical effect on the metals, and when used on painted surfaces, it was found to remove accumulated oxides as well. The product was also added to a number of commercial sewage settling and solids ponds having extremely undesirable odors in the ratio of 1 gallon for 50,000 to 500,000 gallons of sewage composition. After spraying the composition onto the surface of the pond, within about 24 hours the change in the biological waste degradation was clearly noticeable as was the substantial reduction in the pond odors. In still another instance, the product was diluted 4:1 with water and added to a ½-inch drain pipe which was plugged with organic waste materials. Within a few hours, the waste had been substantially digested with full usefulness of the pipe restored. The product was also effective as a degreasing composition and especially suitable in view of its nontoxic nonflammable and nonirritation characteristics as compared with organic solvents generally used for that purpose.

It will be evident that compositions within the purview of the disclosed invention have extensive uses in many cleaning and waste and sewage treatment applications and additional uses may be evident to those skilled in the art.

What is claimed is:

1. An aqueous enzyme composition comprising a major amount of water and a minor amount of a mixture of active ingredients comprising between about 10 and about 25 percent of a fermented reaction product of molasses, sugar, malt, yeast and a magnesium salt, between about 25 and about 40 percent surfactants, between about 0.5 and about 5 percent citric acid, between about 2 and about 10 percent lactic acid, up to about 5 percent pine oil and about 5 and about 30 percent urea, said percents being by weight based on the total active ingredients.

2. A composition of claim 1 wherein the reaction product is prepared by fermenting an aqueous mixture of reactants comprising between about 40 and about 80 percent cane blackstrap molasses, between about 10 and about 40 percent raw cane sugar, between about 3 and about 15 percent diastatic malt, between about 0.2 and about 5 percent yeast and between about 0.2 and about 5 percent magnesium salt, said percents being by weight based on the reactants.

3. The composition of claim 2 wherein the yeast comprises *Saccharomyces Cerevisiae*.

4. The composition of claim 1 wherein the surfactants are selected from the group consisting of organic anionic and nonionic surfactants and inorganic alkali metal phosphates, borates, carbonates, silicates and mixtures thereof.

5. The composition of claim 4 wherein the surfactants comprise a mixture of between about 10 and about 70 percent by weight anionic surfactants selected from the group consisting of alkali metal sulfates of alcohols having between about eight and about 20 carbon atoms and alkali metal salts of fatty acids having between about 10 and about 18 carbon atoms and mixtures thereof, between about 10 and about 30 percent by weight alkyl aryl polyethylene glycol nonionic surfactants and between about 20 and about 40 percent by weight inorganic surfactants selected from the group consisting of sodium tripolyphosphate, sodium pyrophosphate, sodium borate, sodium sesquicarbonate, sodium silicate and mixtures thereof.

6. The composition of claim 1 wherein the ratio of water to active ingredients is between about 2:1 and about 20:1 by weight respectively.

7. A method of improving biological assimilation of organic waste materials comprising treating the materials with a composition of claim 1.

* * * * *